US010926548B2

(12) United States Patent
Anderson et al.

(10) Patent No.: US 10,926,548 B2
(45) Date of Patent: Feb. 23, 2021

(54) PRINTING APPARATUS AND METHODS FOR DETECTING FLUID LEVELS

(71) Applicant: HEWLETT-PACKARD DEVELOPMENT COMPANY, L.P., Houston, TX (US)

(72) Inventors: Daryl E. Anderson, Corvallis, OR (US); James Michael Gardner, Corvallis, OR (US); Scott A. Linn, Corvallis, OR (US); Michael W. Cumbie, Corvallis, OR (US); Berkeley Fisher, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/094,138

(22) PCT Filed: Apr. 29, 2016

(86) PCT No.: PCT/US2016/030252
§ 371 (c)(1),
(2) Date: Oct. 16, 2018

(87) PCT Pub. No.: WO2017/189009
PCT Pub. Date: Nov. 2, 2017

(65) Prior Publication Data
US 2019/0126631 A1 May 2, 2019

(51) Int. Cl.
B41J 29/393 (2006.01)
B41J 2/175 (2006.01)
(52) U.S. Cl.
CPC ....... B41J 2/17566 (2013.01); B41J 2/17546 (2013.01); B41J 2002/17579 (2013.01)

(58) Field of Classification Search
CPC ................... B41J 2/17566; B41J 2002/17579
See application file for complete search history.

(56) References Cited

U.S. PATENT DOCUMENTS

| 4,656,489 | A | 4/1987 | Sato et al. |
| 5,103,368 | A | 4/1992 | Hart |
| 5,399,979 | A * | 3/1995 | Henderson ........... G01N 27/223 324/603 |
| 5,682,184 | A | 10/1997 | Stephany et al. |

(Continued)

FOREIGN PATENT DOCUMENTS

| CN | 1158986 | 9/1997 |
| CN | 1203358 | 12/1998 |

(Continued)

OTHER PUBLICATIONS

International Searchin Authority, "Search Report," issued in connection with PCT patent application No. PCT/US2016/030252, dated Jan. 17, 2017, 3 pages.

(Continued)

Primary Examiner — Lam S Nguyen
(74) Attorney, Agent, or Firm — Hanley Flight & Zimmerman LLC

(57) ABSTRACT

An example printing cartridge includes a fluid container, a plurality of capacitor plates to detect fluid in the fluid container, each of the capacitor plates associated with a respective fluid level, and a shift register to capture fluid level information from the plurality of capacitor plates.

13 Claims, 8 Drawing Sheets

(56) References Cited

U.S. PATENT DOCUMENTS

| | | |
|---|---|---|
| 6,155,664 A | 12/2000 | Cook |
| 6,164,743 A | 12/2000 | Hmelar et al. |
| 6,217,159 B1 | 4/2001 | Morikoshi et al. |
| 6,382,754 B1 | 5/2002 | Morikoshi et al. |
| 6,431,670 B1 | 8/2002 | Schantz et al. |
| 6,568,264 B2 | 5/2003 | Heger |
| 6,642,765 B2 * | 11/2003 | Markovic ............ H03K 3/0372 327/202 |
| 6,782,736 B1 | 8/2004 | Hammer |
| 7,133,153 B2 | 11/2006 | Furukawa |
| 7,575,292 B2 | 8/2009 | Furukawa |
| 8,474,315 B2 | 7/2013 | Ohshima et al. |
| 8,848,012 B2 | 9/2014 | Nagumo |
| 9,085,139 B2 | 7/2015 | Benjamin |
| 9,487,017 B2 | 11/2016 | Ge et al. |
| 2002/0036782 A1 | 3/2002 | Furukawa |
| 2003/0214545 A1 * | 11/2003 | Eguchi ................ B41J 2/17566 347/19 |
| 2005/0280459 A1 * | 12/2005 | Inoue .................... H03K 3/012 327/203 |
| 2007/0002340 A1 | 1/2007 | Furukawa |
| 2007/0011521 A1 * | 1/2007 | Dubey ................ G11C 29/022 714/724 |
| 2011/0234742 A1 | 9/2011 | Nagumo |
| 2014/0002538 A1 | 1/2014 | Benjamin |
| 2015/0273848 A1 | 10/2015 | Ge et al. |

FOREIGN PATENT DOCUMENTS

| | | |
|---|---|---|
| CN | 1309293 | 8/2001 |
| CN | 101625251 | 1/2010 |
| CN | 102589644 | 7/2012 |
| CN | 102589648 | 7/2012 |
| CN | 103857529 | 6/2014 |
| EP | 2925528 | 10/2015 |
| JP | 60213822 | 10/1985 |

OTHER PUBLICATIONS

International Searchin Authority, "Written Opinion," issued in connection with PCT patent application No. PCT/US2016/030252, dated Jan. 17, 2017, 10 pages.

* cited by examiner

PRINTING APPARATUS AND METHODS FOR DETECTING FLUID LEVELS

RELATED APPLICATION

This patent arises from the U.S. national stage of International Patent Application Serial No. PCT/US2016/030252, having an international filing date of Apr. 29, 2016, and which is hereby incorporated by reference in its entirety for all purposes.

BACKGROUND

Inkjet printing devices include print heads having a number of nozzles. The nozzles are used to eject fluid (e.g., ink) onto a substrate to form an image. The nozzles are generally arranged to include at least one column or array such that a properly sequenced ejection of fluid from nozzles may cause characters, symbols, and/or other graphics or images to be printed on the substrate as the print head and the substrate are moved relative to each other. Some print heads include integrated fluid level sensors to sense a level of the fluid in the print head. For example, known printing cartridges may use electrodes to determine fluid levels by measuring the resistance of the fluid on the electrodes.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
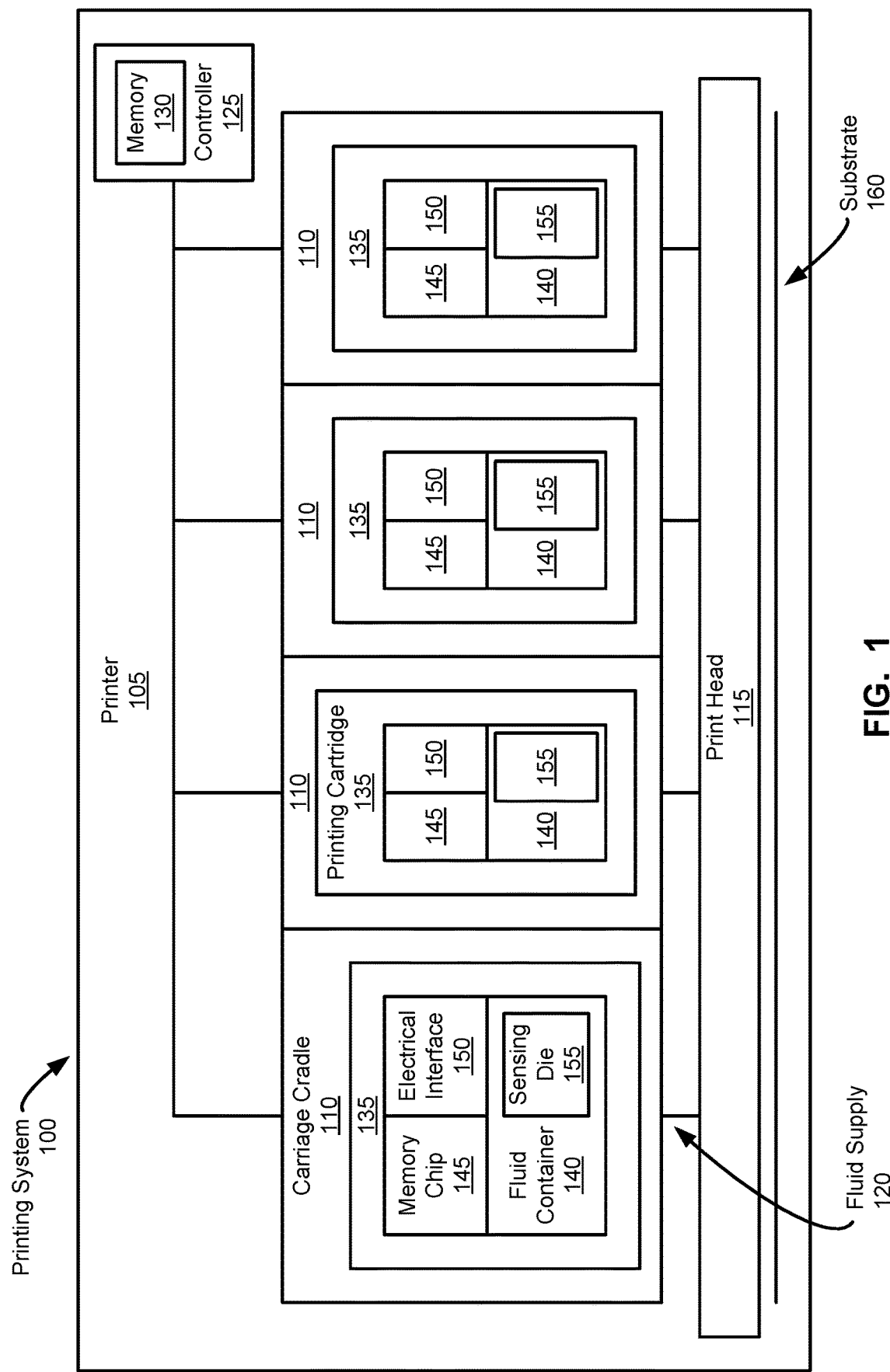
FIG. 1 illustrates a schematic view of an example fluid ejecting system that can be used to implement the examples disclosed herein.

A printing cartridge may include electrical contacts and a fluid container. In some examples, the printing cartridge interfaces with at least one print head through a carriage cradle of a printer to facilitate printing. In some examples, the printing cartridge may include at least one print head housed together in a replaceable device such as an integrated printing cartridge.

The fluid container may store one color of ink. Also, a number of fluid containers may each store a different color of ink. In other examples, such as when used in 3D printing, the fluid container may store a fusing agent or a detailing agent (e.g., water). The printing cartridge may be removed, replaced and/or refilled. Electrical contacts carry electrical signals to and from a controller, for example, to control fluid drop generators in the print heads to eject fluid drops through nozzles and to make fluid level measurements. Some known printing cartridges utilize a silicon die as a sensing device to make fluid level measurements. However, in many instances, silicon is relatively expensive.

The controller may control the print heads for ejection of fluid drops from nozzles, for example, by defining a pattern of ejected fluid drops that form characters, symbols and/or other graphics or images on a print medium. The pattern of ejected fluid drops may be determined by print job commands and/or command parameters from a data source.

In some example implementations of the present subject matter, the printing cartridge includes an electrical interface (e.g., a printer application specific integrated circuit (ASIC)) to determine the level of fluid in the fluid container based on values from a shift register integrated on a sensing die/substrate.

The level of fluid available in the fluid container may be determined for a number of reasons—for example, to determine an appropriate time for replacement of the cartridge and to avoid premature replacement of the cartridge. In some example implementations of the present subject matter, the shift register comprises a series of sensing flip-flops coupled to capacitor plates embedded in the sensing die/substrate. The values stored by the sensing flip-flops vary based on the contents of the fluid container. The contents of the fluid container may be all ink (e.g., a filled ink container), ink and air (e.g., a partially-filled ink container), just air (e.g., an empty ink container), or an agent (e.g., a 3D printing agent). Thus, the value of each of the sensing flip-flops changes with the level of fluid in the fluid container and provides an indication of the level of fluid in the fluid container.

The sensing die/substrate utilizes a shift register to capture and communicate a fluid level measurement within the fluid container. The shift register captures fluid level values upon power-up and then the fluid level values are "shifted off" the sensing die to the electrical interface. As a result, the shift register utilizes a relatively small die area and few interconnections. For example, an example implementation of the shift register may include two supply lines, a clock and a shift-out (e.g., a sensing) line. However, other implementations not having the clock, the shift-out line or both, are also possible.

When a printer fluid level request is received at the shift register (e.g., from the electrical interface), each of the capacitor plates detects whether it is proximal to fluid in the fluid container and the sensing flip-flops associated with the respective capacitor plates store a value based on whether fluid was detected. Once the sensing flip-flops are stabilized (e.g., after a setup period), the values stored by the shift register (e.g., the fluid level values stored by the plurality of sensing flip-flops) are "shifted out" to the electrical interface, which translates the shift register value (e.g., the fluid level values) into a fluid level measurement (e.g., 30% filled). The granularity of the fluid level measurement depends on the number of capacitor plates and sensing flip-flops included in the shift register.

The present subject matter describes fluid level sensing apparatus and methods including a shift register. The fluid level sensing apparatus and methods of the present subject matter reduce the size of a fluid level sensing apparatus integrated with a fluid container, thereby saving cost. The fluid level sensing apparatus and methods of the present subject matter also facilitate a simple communication protocol that reduces silicon area and cost. Furthermore, the present subject matter describes using capacitor plates to sense the level of fluid in the fluid container. The capacitor plates are embedded in the sensing die and reduce, and in some instances even avoid, physical contact between the capacitor plates and the fluid, thereby reducing the likelihood of corrosion of the fluid level sensing apparatus due to physical contact with and/or modifying properties of the fluid and/or the fluid level sensing apparatus.

In accordance with an example implementation of the present subject matter, the electrical interface acquires fluid level information via a shift register embedded in the sensing die. When the shift register is powered-on, fluid level information is latched into the shift register. The latched fluid level information is shifted out on a line (e.g., a shift out line or a sensing line) to the electrical interface. A clock signal is provided by the electrical interface to the shift register to shift-out the fluid level information.

The circuitry on the shift register facilitates as many sensing flip-flops as fluid levels to be detected. For example, the shift register may include 100 sensing flip-flops to provide fluid level measurements in one percent increments, may include 20 sensing flip-flops to provide fluid level measurements in five percent increments, etc. Each sensing flip-flop is associated with a capacitor plate that connects a latch of the sensing flip-flop to a position in the fluid container such that the capacitor plate senses fluid in the fluid container if the fluid level is at or above the height of the capacitor plate relative to the fluid container.

When the shift register powers-up (e.g., via a voltage supply line provided by the electrical interface), each of the sensing flip-flops stores a value indicative of whether fluid was detected via the associated capacitor plate. In accordance with an example implementation of the present subject matter, the sensing flip-flops are designed so that they store a first value (e.g., a logical low value, a "false" value, a "0" value, etc.) when the capacitor plate senses (e.g., detects) fluid in the fluid container and store a second value (e.g., a logical high value, a "true" value, a "1" value, etc.) when the capacitor plate does not sense fluid. In other example implementations, the sensing flip-flops may be designed so that they store a logical high value when the capacitor plate senses fluid in the fluid container and store a logical low value when the capacitor plate does not sense fluid.

In accordance with an example implementation of the present subject matter, the fluid level sensing apparatus and methods implement a setup period once the shift register powers-up to ensure that the fluid level values stored in the sensing flip-flops are stable. The duration of the setup period may be determined via empirical testing or simulations. After the setup period expires, the shift register responds to an instruction to "shift out" the fluid level values to the electrical interface for translating. For example, the electrical interface may map a count of logical high values to a fluid level measurement (e.g., a percentage filled). In accordance with an example implementation of the present subject matter, the fluid level sensing apparatus powers-down the shift register once the fluid level measurement is determined.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 is a block diagram of an example printing system 100 that can be used to implement the teachings of this disclosure. The example printing system 100 of FIG. 1 includes an example printer 105, example carriage cradles 110 and example printing cartridges 135. In an example implementation, the printer 105 is an inkjet printer (e.g., a thermal inkjet printer, a piezo inkjet printer, a continuous inkjet printer, etc.). In some examples, the printer 105 is a 3D printer used to print three-dimensional objects.

The example printer 105 of FIG. 1 includes at least one carriage cradle 110 to receive and exchange at least one corresponding printing cartridge 135. The carriage cradles 110 are arranged to establish a fluidic interface between the printing cartridges 135 and a print head 115 via a fluid supply 120. The example printer 105 of FIG. 1 includes four carriage cradles 110. However, other implementations may use any other number of carriage cradles 110. In an example implementation, the print head 115 is a page-wide array print head. However, other types of print heads, such as a scanning print head, may be used, alone or in combination with the aforedescribed print heads. During a print operation, a substrate 160 (e.g., paper) extends under the print head 115. In some examples, the printer 105 may move the carriage cradle 110 over the substrate 160.

In an example implementation, the printer 105 is provided with a controller 125 including a memory 130. The controller 125 may retrieve and execute executable code from the memory 130. For example, the controller 125 may execute executable code to cause a power supply unit to provide power to the example print head 115. The memory 130 may include a variety of information such as an identifier of the printer 105, an identifier of printing cartridges 135 that may be used with the printer 105, calibration data, error information, etc.

The example printing cartridges 135 of FIG. 1 include a fluid container 140, a memory chip 145 and an electrical interface 150. The carriage cradles 110 are arranged to connect the fluid containers 140 to the print head 115 through the fluid supply 120. In an example implementation, each printing cartridge 135 may include a different fluid in the respective fluid containers 140. For example, if the printer 105 is an inkjet printer, the fluid in each fluid container 140 may include ink of a specific color (e.g., a cyan color, a magenta color, a yellow color, a black color and/or gray color, etc.). In another example, if the printer 105 is a 3D printer, the fluid in each fluid container 140 may be an agent such as a fusing agent or a detailing agent (e.g., water). The printing cartridges 135 of FIG. 1 are arranged to be exchanged with respect to the corresponding carriage cradle 110.

The memory chip 145 of the printing cartridges 135 may include a variety of information such as an identifier of the type of printing cartridge 135, an identification of the kind of fluid contained in the fluid container 140, calibration data, error information and/or other data. In some examples, the memory chip 145 includes information indicating when the respective printing cartridge 135 should receive maintenance. In some examples, the printer 105 can take appropriate action based on the information contained in the memory chip 145, such as altering printing routines to maintain image quality.

In an example implementation, the controller 125 may retrieve data from the electrical interface(s) 150. For example, the controller 125 may request the electrical interface(s) 150 provide cartridge characteristics such as product characteristics, fluid quantity characteristics, fluid type characteristics, etc.

In some examples, the printing cartridges 135 may include an integrated print head. For example, the print head 115, the fluid supply 120 and the fluid container 140 may be housed together in a replaceable device such as an integrated printing cartridge.

To make fluid level measurements, the printing cartridges 135 are provided an example sensing die 155. The example sensing die 155 includes a shift register and a plurality of capacitor plates to capture fluid levels within the fluid container 140 and to communicate the fluid levels (e.g., to the controller 125). The example sensing die 155 facilitates sensing fluid level information upon power-up of the sensing die 155. For example, upon power-up, the capacitor plates may detect whether a fluid (e.g., ink) is present at a level associated with the respective capacitor plate and the shift register may latch a corresponding value. The shift register then transmits (e.g., "shifts-out") the fluid level information to the electrical interface 150 and/or the controller 125.

Figure 2:
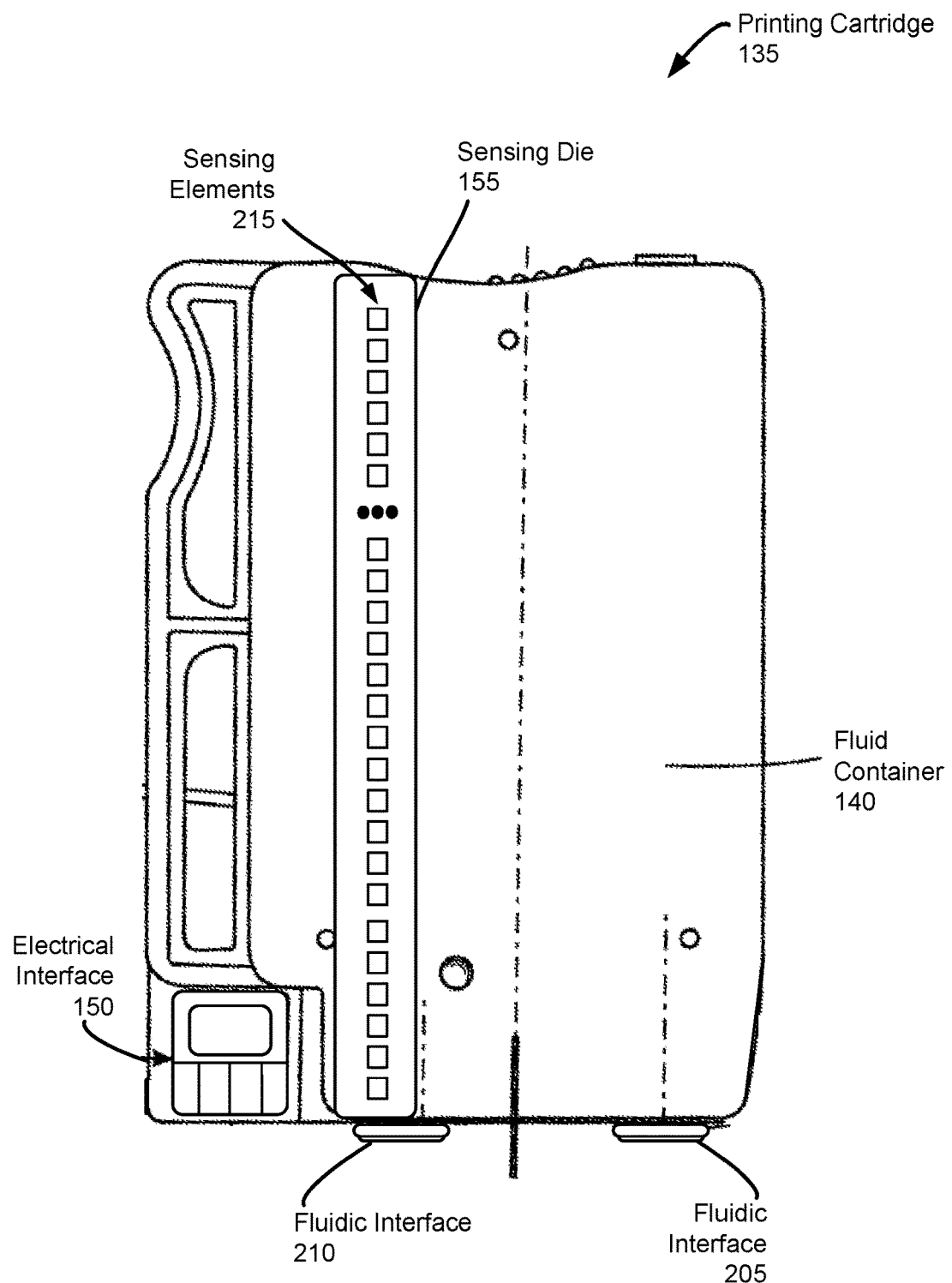
FIG. 2 illustrates a schematic view of an example printing cartridge that can be used with the example fluid ejecting system of FIG. 1 to implement the examples disclosed herein.

FIG. 2 is a block diagram of an example printing cartridge 135 that can be used with the example printing system 100 of FIG. 1. In this example, the printing cartridge 135 includes the example fluid container 140, the example electrical interface 150, example fluidic interfaces 205, 210 and the example sensing die 155 including a plurality of sensing elements 215. In some implementations, the sensing elements 215 include a sensing flip-flop to store a value and a capacitor plate to detect whether a fluid (e.g., ink) is present at the fluid level.

The example fluidic interfaces 205, 210 establish a fluidic connection with the printer 105 (FIG. 1). For example, the first fluidic interface 205 may be a seal ring (e.g., a socket) to receive a fluid pen extending from the carriage cradle 110 (FIG. 1). In an example implementation, the first fluidic interface 205 may guide a print fluid, such as ink, from the fluid container 140 to the carriage cradle 110. During a print operation, the printing system 100 prints by retrieving the first fluid (e.g., a print fluid) from the ink container 140 via the first fluidic interface 205.

The second fluidic interface 210 may facilitate transporting a gas, such as air, to and from the fluid container 140, for example, to implement pressure control inside the fluid container 140. The gas may be ambient air. In an example implementation, the second fluid interface 210 may be connected to a pressure bag located within the fluid container 140.

To make fluid level measurements, the printing cartridge 135 includes the example sensing die 155. In the illustrated example, the sensing die 155 is made of silicon and is in contact with the fluid container 140 from the top to the bottom of the fluid container 140. The example sensing die 155 includes a plurality of sensing elements 215 to sense fluid levels within the fluid container 140 and to communicate the fluid levels, for example, to the controller 125 of FIG. 1. The example sensing elements 215 capture fluid level information upon power-up of the sensing die 155. For example, each of the sensing elements 215 may store a first value (e.g., a logical high value) when fluid is not detected and may store a second value (e.g., a logical low value) when fluid is detected in the fluid container 140. The sensing elements 215 then transmit (e.g., "shift-out") the fluid level information to the electrical interface 150, which may then provide the fluid level information to the controller 125. In some examples, the electrical interface 150 may process the fluid level information prior to transmitting the information to the controller 125. For example, the electrical interface 150 may generate a signal based on the fluid level information provided by the sensing elements 215. The electrical interface 150 may communicate the signal to the controller 125 via an electrical connection established with the printer 105 through the carriage cradle 110.

The number of sensing elements 215 included in the sensing die 155 varies based on the desired granularity of the fluid level measurements. For example, one hundred sensing elements 215 may be positioned in the sensing die 155 so that each sensing element 215 corresponds to one percent fluid-filled increments. However, other implementations may use any other number of sensing elements 215.

Figure 3:
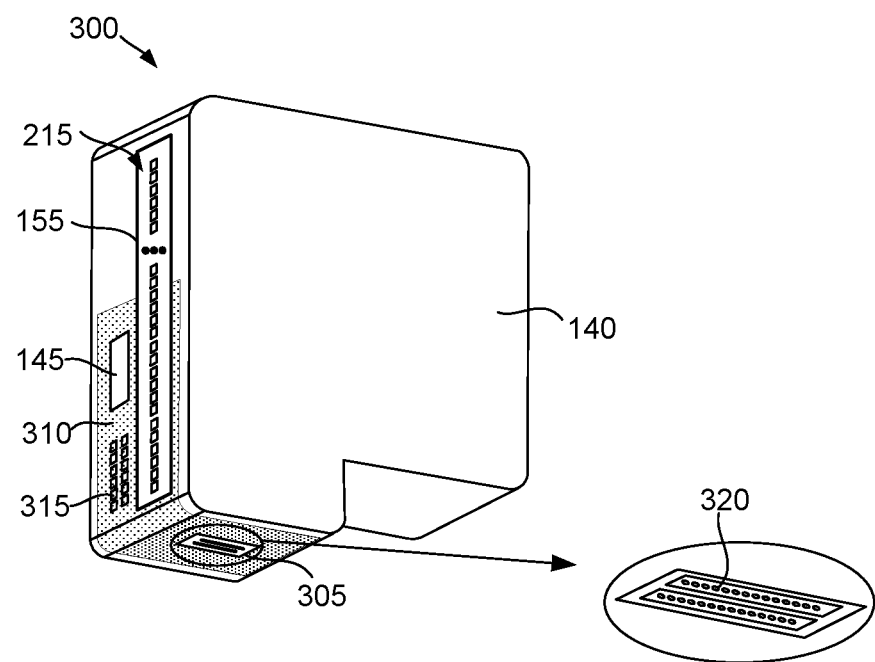
FIG. 3 illustrates a schematic view of another example printing cartridge that can be used to implement the examples disclosed herein.

FIG. 3 is a block diagram of another example printing cartridge 300 that can be used with the example printing system 100 of FIG. 1. In this example, the printing cartridge 300 is an integrated printing cartridge including the fluid container 140 and an example print head 305. The example printing cartridge 300 also includes an example flexible cable 310, example conductive pads 315, example nozzles 320, the example memory chip 145 and the example sensing die 155 of FIGS. 1 and/or 2 including a plurality of sensing elements 215. The example flexible cable 310 is coupled to the sides of the printing cartridge 300 and includes traces that couple the example memory chip 145, the example print head 305, the example conductive pads 315 and the example sensing die 155.

In operation, the example printing cartridge 300 may be installed in the carriage cradle 110 of, for example, the example printer 105 of FIG. 1. When the example printing cartridge 300 is installed within the carriage cradle 110, the example conductive pads 315 are pressed against corresponding electrical contacts in the carriage cradle 110 to enable the example printer 105 to communicate with and/or control the electrical functions of the printing cartridge 300. For example, the example conductive pads 315 enable the printer 105 to access and/or write to the example memory chip 145.

The memory chip 145 of the illustrated example may include a variety of information such as an identifier of the type of printing cartridge, an identification of the kind of fluid contained in the fluid container, calibration data, error information and/or other data. In some examples, the memory chip 145 includes information indicating when the printing cartridge 300 should receive maintenance. In some examples, the printer 105 can take appropriate action based on the information contained in the memory chip 145, such as altering printing routines to maintain image quality.

To make fluid level measurements, the printing cartridge 300 includes the example sensing die 155. The example sensing die 155 includes the plurality of sensing elements 215 to sense fluid levels within the fluid container 140 and to communicate the fluid levels (e.g., to the controller 125). The example sensing elements 215 capture fluid level information upon power-up of the sensing die 155. For example, each of the sensing elements 215 may include a flip-flop to store a first value (e.g., a logical low value) when fluid is detected in the fluid container 140 at a level associated with the sensing element 215 and may store a second value (e.g., a logical high value) when fluid is not detected. In an example implementation, the sensing elements 215 detect and store the fluid level values simultaneously (e.g., at or substantially-near the same time). The sensing elements 215 then transmit (e.g., "shift-out") the fluid level information to the controller 125 via the flexible cable 310.

Figure 4:
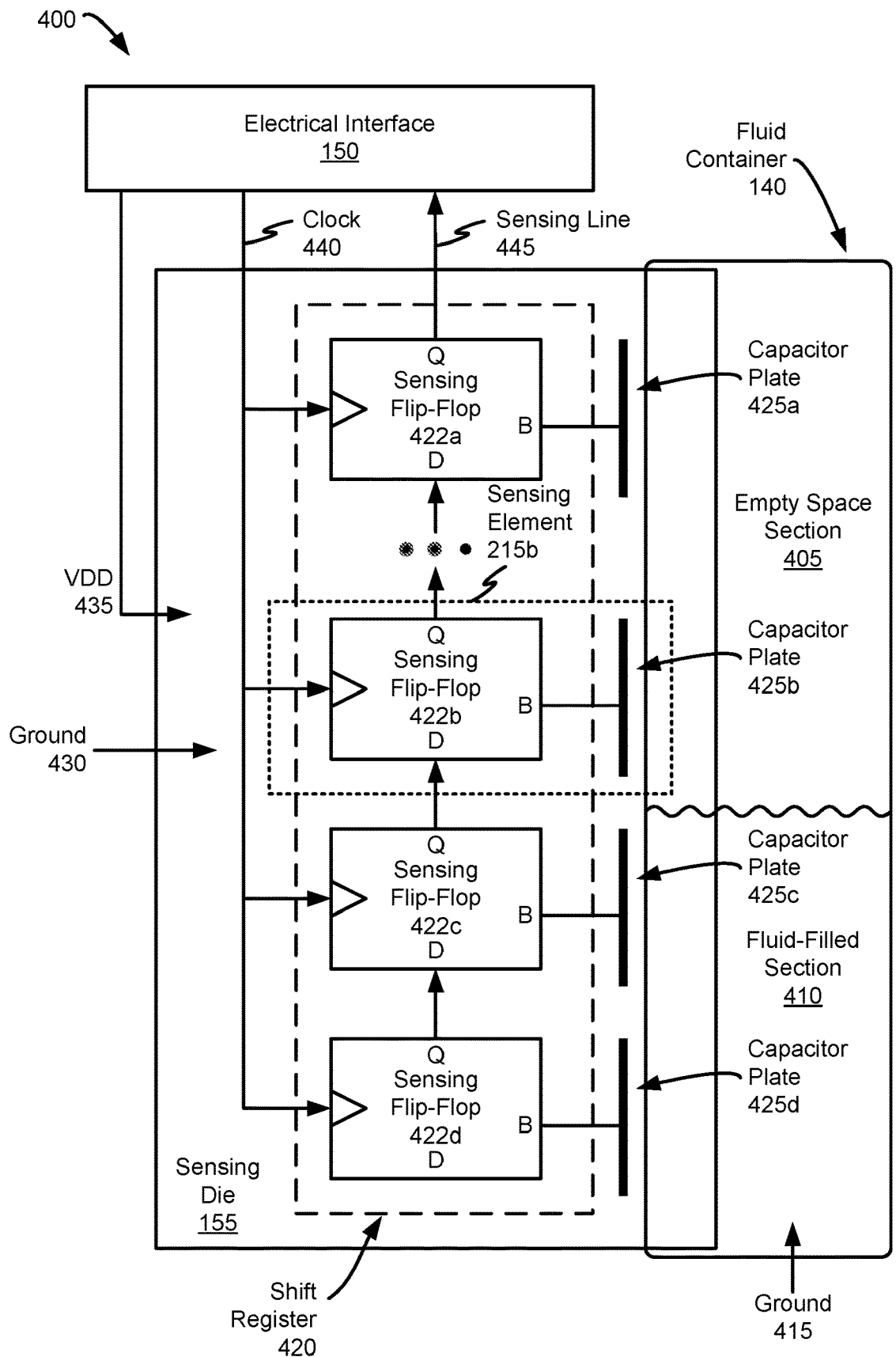
FIG. 4 illustrates a schematic view of a sensing die with a shift register in communication with an electrical interface, according to an example implementation of the present subject matter.

FIG. 4 is a block diagram of an example implementation of the sensing die 155 of FIGS. 1, 2 and/or 3, according to an example implementation of the present subject matter. In an example implementation, the sensing die 155 is in contact with the fluid container 140 and in communication with the electrical interface 150. In the illustrated example, the fluid container 140 includes an example empty space section 405 and an example fluid-filled section 410. A reservoir ground 415 is provided to the fluid container 140.

The example sensing die 155 includes four sensing elements 215a, 215b, 215c, 215d. The sensing elements, collectively referred to as sensing elements 215, include a sensing flip-flip 422 and a capacitor plate 425. The sensing flip-flops, collectively referred to as sensing flip-flops 422, implement an example shift register 420 (e.g., a serial-in and serial-out shift register). For example, the output of each sensing flip-flop 422 is connected to the input of the next sensing flip-flop 422 in the series (e.g., the output Q-line of the fourth sensing flip-flop 422d is connected to the input D-line of the third sensing flip-flop 422c). The sensing elements 215 are electrically connected to the fluid container 140 via corresponding capacitor plates 425a, 425b, 425c, 425d. The capacitor plates, collectively referred to as capacitor plates 425, capacitively complete an electrical circuit when fluid (e.g., ink) in the fluid container 140 is detected. The sensing die 155 is also provided a common ground 430.

The sensing flip-flops 422 store a value representative of whether fluid is detected or not detected by the corresponding capacitor plates 425. In the illustrated example, a sensing flip-flop 422 stores a first value (e.g., a logical low value) when the corresponding capacitor plate 425 is proximate to fluid in the fluid container 140 (e.g., the example capacitor plates 425c, 425d located in the fluid-filled section 410) because the sensing flip-flop 422 is connected to the ground 415 via the fluid in the fluid-filled section 410. In such instances where the capacitor plate 425 is proximate to a fluid in the fluid container 140, the additional capacitance (e.g., due to the fluid) detected at the capacitor plate 425 slows the rise of the voltage at the corresponding sensing flip-flop 422, thereby resulting in the sensing flip-flop 422 storing the logical low value. The sensing flip-flops 422 of the illustrated example of FIG. 4 store a second value (e.g., a logical high value) when the corresponding capacitor plate 425 is not proximate to fluid in the fluid container 140 (e.g., the example capacitor plates 425a, 425b located in the empty space section 405) due to the relatively faster rise of the voltage at the corresponding sensing flip-flop 422.

In the illustrated implementation, the sensing die 155 replies to queries from the electrical interface 150 (e.g., requests to sense fluid levels). The example electrical interface 150 provides power to the sensing die 155 and/or the shift register 420 and processes the fluid level information transmitted by the shift register 420. The electrical interface 150 is in electrical communication with the sensing die 155. In the illustrated example, the electrical interface 150 provides a voltage supply line 435 to the sensing die 155. In some implementations, the voltage supply line 435 may be provided to the sensing flip-flops 422. The example electrical interface 150 provides power to the sensing die 155 when requesting a fluid level measurement. The example electrical interface 150 disables power to the sensing die 155 when the fluid level measurement from the shift register 420 is received. In an example implementation, each sensing flip-flop 422 stores a value indicative of whether fluid is detected by the corresponding capacitor plate 425 when voltage is provided to the sensing die 155 via the voltage supply line 435. For example, the sensing flip-flops 422 simultaneously (e.g., at or substantially-near the same time) store first values and/or second values.

The sensing flip-flops 422 are connected to a clock 440 controlled by the electrical interface 150. The clock 440 is utilized by the electrical interface 150 to "shift-out" fluid level information stored by the sensing flip-flops 422 via an example sensing line 445. In an example implementation, the sensing flip-flops 422 "shift-out" fluid level information in serial and based on the clock 440. For example, during a first rising-edge clock signal, the third sensing flip-flop 422c shifts its stored value (e.g., a value representative of whether the corresponding capacitor plate 425c detected fluid) to the second sensing flip-flop 422b via the output Q-line. The third sensing flip-flop 422c also stores a fluid level value received from the fourth sensing flip-flop 422d via the input D-line. At the next rising-edge clock signal, the third sensing flip-flop 422c shifts the value received from the fourth sensing flip-flop 422d to the second sensing flip-flop 422b and stores the next fluid level value received from the sensing flip-flop 422d (if any). In an example implementation, the shift out process continues until all values stored in the sensing flip-flops 422 are communicated to the electrical interface 150. For example, the number of rising-edge clock signals provided by the electrical interface 150 may correspond to the number of sensing flip-flops 422 included in the shift register 420.

In some implementations, the sensing die 155 may generate the clock signal 440. For example, the sensing die 155 may include a ring oscillator. In some such examples, the sensing die 155 may include circuitry (e.g., flip-flops) to initiate a "start" sequence and omit the clock signal 440 from the electrical interface 150.

In some implementations, the sensing flip-flops 422 may transmit the fluid level information via the voltage supply line 435. In some such examples, the electrical interface 150 may include circuitry to sense a change (e.g., a reduced voltage) in the voltage carried over the voltage supply line 435 to determine when the sensing flip-flops 422 are transmitting information. For example, the sensing flip-flops 422 may transmit a first value (e.g., a logical low value) by pulling the voltage carried over the voltage supply line 435 by a first percentage (e.g., five percent) and communicate a second value (e.g., a logical high value) by pulling the voltage carried over the voltage supply line 435 by a second percentage (e.g., ten percent). In some such implementations, the voltage supply line 435 may be a dedicated line with relatively high impedance. By transmitting the fluid level information via the voltage supply line 435, the sensing die 155 may omit the sensing line 445.

In operation, the electrical interface 150 initiates fluid level measurement by providing power to the sensing die 155 via the voltage supply line 435. The electrical interface 150 may initiate fluid level measurement in response to a command from a user (e.g., via a fluid level measurement control on the printer 105, via a fluid level measurement control in a graphical interface, etc.), in response to a page count (e.g., after every one page printed, after every ten pages printed, etc.), etc. During power-up, the capacitor plates 425 detect whether fluid is present (e.g., is proximate to the capacitor plate 425). The fluid level values are stored in the corresponding sensing flip-flops 422.

Figure 5:
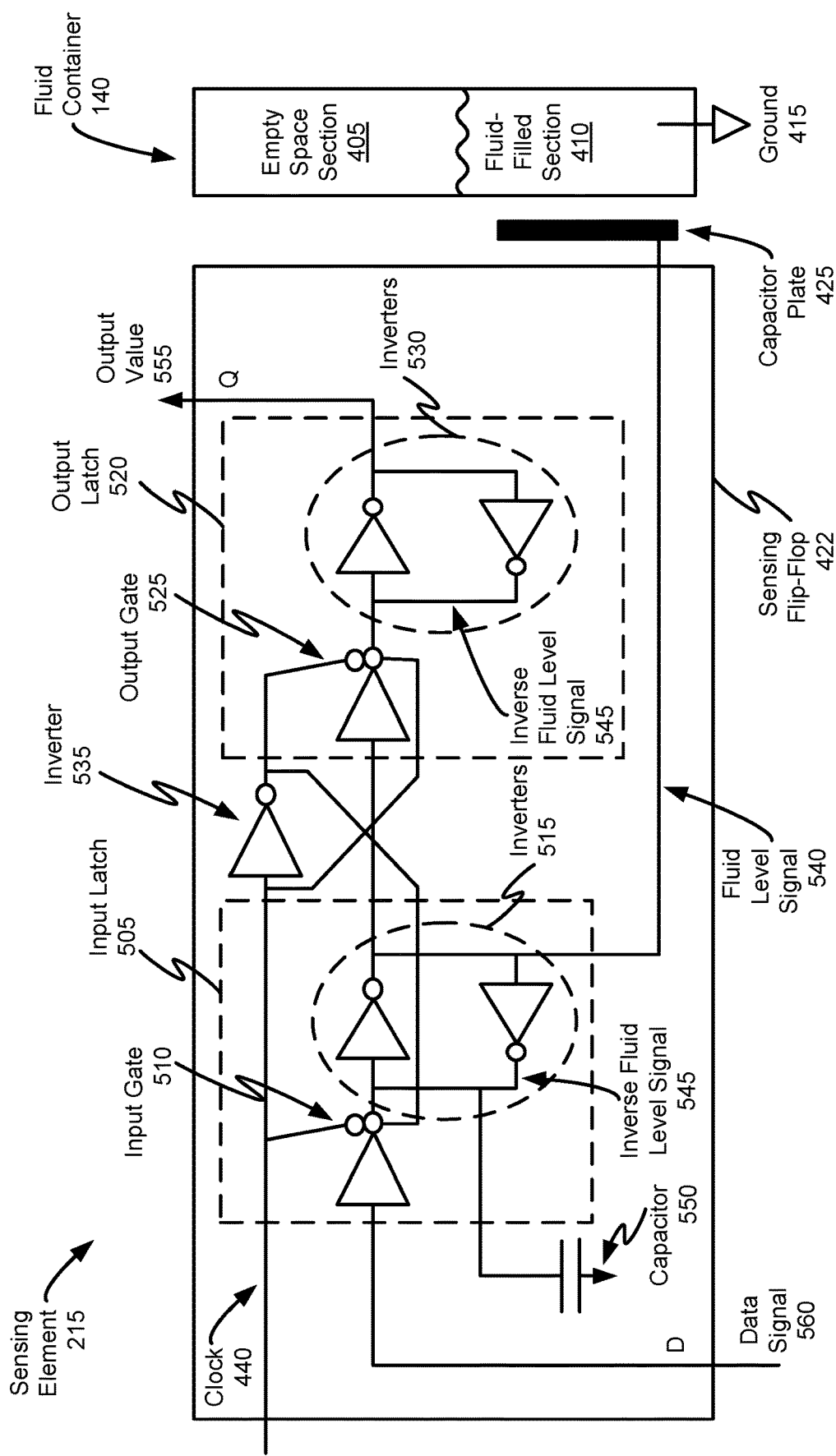
FIG. 5 illustrates electrical connections in a sensing flip-flop of the sensing die, according to an example implementation of the present subject matter.

As disclosed in connection with FIG. 5, the sensing elements 215 operate so that when a capacitor plate 425 is not proximate to fluid in the fluid container 140 (e.g., the example capacitor plates 425a, 425b), a fluid signal provided by the capacitor plate 425 is biased (e.g., influenced, pulled, etc.) to cause the corresponding sensing flip-flop 422 to store a logical high value (e.g., a high value). When a capacitor plate 425 is proximate with fluid in the fluid container 140 (e.g., the example capacitor plates 425c, 425d), an electrical circuit is completed through the capacitor plate 425, with the fluid (e.g., ink) in the fluid container 140 acting as a second capacitor plate that is connected through the ink to the ground 415. However, the reservoir ground 415 provided to the fluid container 140 biases an inverse fluid signal to rise relatively slow, which causes the corresponding sensing flip-flop 422 to store a logical low value.

After a setup period, during which the fluid level values stored by the sensing flip-flops 422 are stabilized (e.g., are set to a first value (e.g., a logical low value) or a second value (e.g., a logical high value), the electrical interface 150 transmits a series of clock signals 440 to the shift register 420 to cause the shift register 420 to transmit the fluid level values. For example, the electrical interface 150 may transmit four clock signals 440 to the shift register 420 to cause the shift register 420 to transmit the four fluid level values captured by the four sensing flip-flops 422a, 422b, 422c, 422d. The shift register 420 "shifts-out" the fluid level values to the electrical interface 150 via the sensing line 445. The sensing flip-flops 422 corresponding to capacitor plates 425 proximate to fluid (e.g., the example third and fourth capacitor plates 425c, 425d) "shift out" a first value (e.g., a logical low value) and the sensing flip-flops 422 corresponding to capacitor plates 425 not proximate to fluid (e.g., the example first and second capacitor plates 425a, 425b) "shift out" a second value (e.g., a logical high value). The setup period may be a preset time period based on empirical or simulated testing. The setup period may also be selected as a time period long enough to allow the sensing flip-flops 422 to stabilize fluid level values. For example, implementing a one microsecond setup period after providing power to the sensing die 155 may allow the sensing flip-flops 422 to stabilize. In the illustrated example, the electrical interface 150 transmits a periodic clock signal 440 to enable all of the sensing flip-flops 422 to "shift-out" their fluid level values.

In an example implementation, the electrical interface 150 maps (e.g., translates, interprets, etc.) the fluid level values provided by the shift register 420 to make a fluid level measurement for the fluid container 140. In some examples, the electrical interface 150 may count the number of logical high values before a logical low value is received and associate the count logical high values with a fluid level measurement. For example, assuming a sensing die 155 includes 100 sensing elements 215 and the electrical interface 150 counts 75 logical high values before a logical low value, the electrical interface 150 may determine the fluid container 140 is 25 percent full. Also, the electrical interface 150 may determine a fluid level measurement based on the number of logical low values received from the shift register 420.

In some examples, the electrical interface 150 may include a false-positive test to reduce the number of inaccurate measurements. For example, fluid may be proximate to the capacitor plate 425a in the empty space section 405 of the fluid container 140. In such instances, to prevent incorrectly interpreting the fluid level, the electrical interface 150 may monitor the number of logical high values before and/or after a logical low value is detected. If, for example, a threshold number of logical high values are counted before and/or after a logical low value, the electrical interface 150 may determine the logical low value is a false-positive and count the value as a logical high value (e.g., fluid not detected at the corresponding position in the fluid container 140) instead of a logical low value. However, other techniques of interpreting fluid level information captured by the shift register 420 may be used, alone or in combination with the aforedescribed shift register 420.

In the illustrated implementation, the sensing die 155 and/or the shift register 420 responds to requests for fluid level measurements from the electrical interface 150. In some examples, the sensing die 155 and/or the shift register 420 may also respond to requests for fluid level measurements from the controller 125 of FIG. 1. For example, if a printing cartridge does not include an electrical interface, the sensing die 155 and/or shift register 420 may receive requests to sense fluid levels from the controller 125.

FIG. 5 illustrates electrical connections in an example sensing element 215, according to an example implementation of the present subject matter. The example sensing element 215 includes the example sensing flip-flop 422 and the example capacitor plate 425. The example sensing flip-flip 422 includes the clock signal 440 controlled by the electrical interface 150. The clock signal 440 is electrically connected to an input latch 505 and an output latch 520. The capacitor plate 425 is in circuit with the input latch 505 via a fluid level signal 540.

The input latch 505 includes an input gate 510 and inverters 515. The input gate 510 is controlled by the clock signal 440. The output latch 520 includes an output gate 525 and inverters 530. The clock signal 440 is connected to the output latch 520 via an inverter 535.

In the illustrated example, the input gate 510 and the output gate 525 are implemented by a tristate driver. However, other techniques for implementing a switch may be used, alone or in combination with the aforedescribed tristate driver. In the illustrated example, the input latch 505 and the output latch 520 are implemented by gates 510, 525, respectively, and two inverters 515, 530, respectively. However, other implementations of a latch (e.g., a memory element) may be used, alone or in combination with the aforedescribed latch.

When the sensing die 155 is in a power-off state (e.g., the voltage from the electrical interface 150 to the sensing die 155 via the voltage supply line 435 is zero (or substantially near zero (e.g., within plus or minus five percent of zero))), the voltages and current across the sensing flip-flop 422 are also set to zero (or substantially near zero). When the sensing die 155 is powered-on (e.g., to make a fluid level measurement), the output latch 520 stores a fluid level value based on whether the capacitor plate 425 is proximate to fluid in the fluid container 140. However, when the sensing die 155 is initially powered-on (e.g., receives power via the voltage supply line 435 of FIG. 4), a situation may arise where the value stored in the input latch 505 and/or the output latch 520 is unknown. For example, fluid level signal 540 and inverse fluid level signal 545 can both be a logical high value (e.g., 2 volts), both be a logical low value (e.g., 0 volts), or can be between (e.g., at 50 percent) a logical high value and a logical low value.

To reduce the likelihood of an unknown value, the sensing element 215 may include circuitry to bias (e.g., weigh or influence) the fluid level signal 540 and/or the inverse fluid level signal 545. As discussed above, when the fluid container 140 includes fluid (e.g., ink), the capacitor plate 425 capacitively completes an electrical circuit. In an example implementation, the fluid container 140 includes the reservoir ground 415. When the electrical circuit is complete (e.g., when the capacitor plate 425 is positioned proximate to the fluid-filled section 410 of the fluid container 140), the reservoir ground 415 pulls (e.g., biases) the fluid level signal 540 towards a logical low value (e.g., 0 volts). As a result, the relatively low fluid level signal 540 causes the latches 505, 520 to store a logical low value when the capacitor plate 425 is proximate to fluid in the fluid container 140.

To stabilize the fluid level value stored in the latches 505, 520 when the capacitor plate 425 is not proximate to fluid in the fluid container 140 (e.g., the capacitor plate 425 is positioned in the empty space section 405 of the fluid container 140), the inverse fluid level signal 545 is biased (e.g., influenced) by an example capacitor 550. For example, the capacitor 550 may pull (e.g., bias) the inverse fluid level signal 545 towards a logical low value. As a result, the relatively low voltage inverse fluid level signal 545 causes the latches 505, 520 to store a logical high value when the capacitor plate 425 is not proximate to fluid in the fluid container 140.

The sizes of the inverter 535, the inverters 515, 530 and the capacitor 550 are selected to balance the bias of the fluid level signal 540 and the inverse fluid level signal 545. For example, the size of the capacitor 550 may be selected so as not to offset the bias provided to the fluid level signal 540 by the reservoir ground 415 when fluid is detected in the fluid container 140.

In operation, when the sensing die 155 is in a powered-off state, the voltages across the sensing flip-flop 422 are set to a logical low value (e.g., zero (or substantially zero) volts). When a voltage is provided to the sensing die 155 (e.g., by the voltage supply line 435 of FIG. 4), the latches 505, 520 latch a fluid level value representative of whether the capacitor plate 425 is proximal to fluid in the fluid container 140. In an example implementation, the latches 505, 520 store a first value (e.g., a logical low value) when the capacitor plate 425 is proximate to fluid in the fluid container 140 and the latches 505, 520 store a second value (e.g., a logical high value) when the capacitor plate 425 is not proximal to fluid.

After a setup period to allow the fluid level values in the latches 505, 520 to stabilize, the electrical interface 150 sends a shift signal via the clock 440 to communicate (or transmit) the latched (e.g., stored) fluid level values. For example, the sensing flip-flops 422 of the shift register 420 may sequentially "shift-out" the fluid level values on the sensing line 445 in response to a rising-edge clock signal provided via the clock 440. During a "shift-out" process, output value 555 represents the value stored in the output latch 520 and the value "shifted-out" to the next sensing flip-flop 422 in the series of sensing flip-flops 422 via a data signal line 560 or to the electrical interface 150 via the sensing line 445.

The duration and number of rising-edge clock signals may depend on the number of sensing flip-flops 422 included in the shift register 420. For example, if the shift register 420 includes fifty sensing flip-flops 422, the electrical interface 150 may provide fifty clock cycles to "shift out" the fluid level values from the shift register 420. In an example implementation, when the "shift-out" process is complete, the electrical interface 150 powers-off the sensing die 155 by transitioning the voltage supply line 435 to a logical low value (e.g., zero volts) and the voltages across the sensing flip-flops 422 are set to zero (or substantially near zero) volts.

Figure 6:
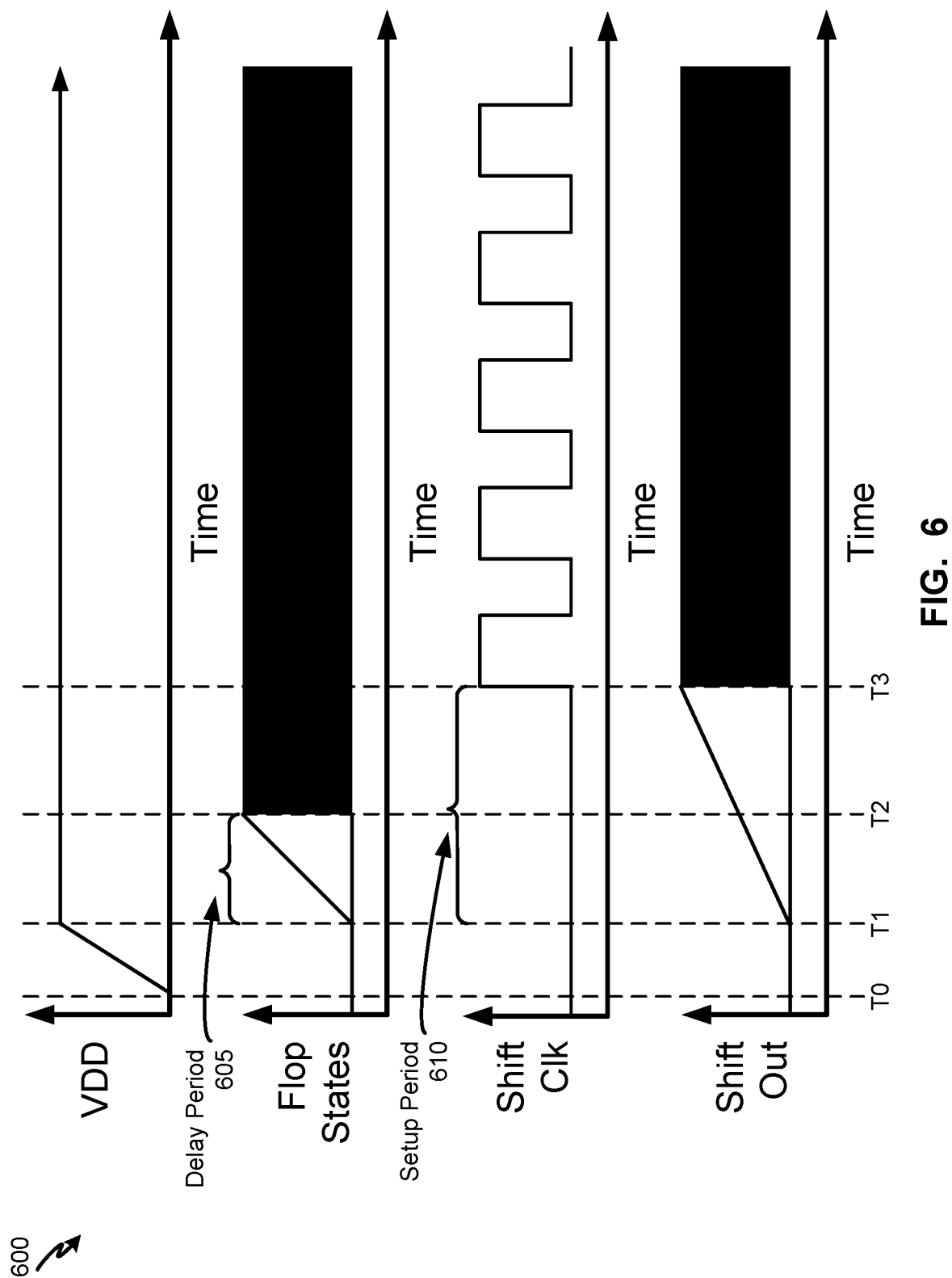
FIG. 6 illustrates an example sensing sequence, according to an example implementation of the present subject matter.

FIG. 6 illustrates a sensing sequence 600 with respect to power, memory stabilization, clock signals and shift-out signals over time. At time T0, a power-on signal is received at the sensing die 155. For example, the electrical interface 150 may provide power to the sensing die 155 via the voltage supply line 435 in response to a fluid level measurement request. At time T1, the voltage across the sensing die 155 stabilizes (e.g., is set to a logical high value) and the sensing flip-flops 422 start storing fluid level values based on signals provided by the capacitor plates 425. In the illustrated sequence 600, a delay period 605 occurs between when the voltage across the sensing die 155 stabilizes at time T1 and when the fluid level values are stabilized in the latches 505, 520 of the sensing flip-flops 422 at time T2. At time T2, the fluid level values are stabilized in the sensing flip-flops 422.

At time T3, the electrical interface 150 initiates a "shift-out" process to transmit the fluid level values stored in the sensing flip-flops 422 to the electrical interface 150 by sending a shift signal to the shift register 420. In the illustrated sequence 600, the shift signal is a periodic clock signal transmitted via the clock 440. A setup period 610 occurs between when the sensing flip-flops 422 begin latching fluid level values at time T1 and when the shift signal is initiated at time T3. The duration of the setup period 610 is selected to ensure that the sensing flip-flops 422 are stable before the fluid level values are transmitted to the electrical interface 150. The duration of the setup period 610 may be determined based on empirical testing and/or simulated testing. In some example implementations, the electrical interface 150 may initiate a setup period timer at time T1 to reference the start of the setup period 610. In the illustrated sequence 600, the "shift-out" process is triggered on the rising-edge of the shift clock signal 440. In an example implementation, the shift clock signal 440 continues until all of the fluid level values are transmitted to the electrical interface 150. The electrical interface 150 may then power-down the shift register 420 by setting the voltage across the voltage supply line 435 to a logical low value.

Although not shown in the illustrated sequence 600, a propagation delay may occur between when the shift clock signal is received at a sensing flip-flop 422 at time T3 and when the sensing flip-flop 422 "shifts-out" its output value 555 to the next sensing flip-flop 422 in the shift register 420 via the data signal line 560 or to the electrical interface 150 via the sensing line 445.

While an example manner of implementing the printing system 100 is illustrated in FIGS. 1-4 and/or 5, in some examples, at least one of the elements, processes and/or devices illustrated in FIGS. 1-4 and/or 5 may be combined, divided, re-arranged, omitted, eliminated and/or implemented in any other way. Further, the example controller 125, the example memory 130, the example memory 145, the example electrical interface 150 and/or, more generally, the example printing system 100 of FIGS. 1-4 and/or 5 may be implemented by hardware, software, firmware and/or any combination of hardware, software, and/or firmware. Thus, for example, any of the example controller 125, the example memory 130, the example memory 145, the example electrical interface 150 and/or, more generally, the example printing system 100 of FIGS. 1-4 and/or 5 can be implemented by a circuit(s), a programmable processor(s), an application specific integrated circuit(s) (ASIC(s)), a programmable logic device(s) (PLD(s)), a field programmable gate array(s) (FPGA(s)) and/or a field programmable logic device(s) (FPLD(s)), etc.

When reading any of the apparatus or system claims of this patent to cover a purely software and/or firmware implementation, at least one of the example controller 125, the example memory 130, the example memory 145, the example electrical interface 150 is hereby expressly defined to include a tangible computer readable storage device or storage disc such as a memory, DVD, CD, Blu-ray, etc. storing the software and/or firmware. Further still, the example printing system 100 of FIGS. 1-4 and/or 5 may include an element(s), process(es) and/or devices in addition to, or instead of, those illustrated and/or may include more than one of any or all of the illustrated elements, processes and devices.

Figure 7:
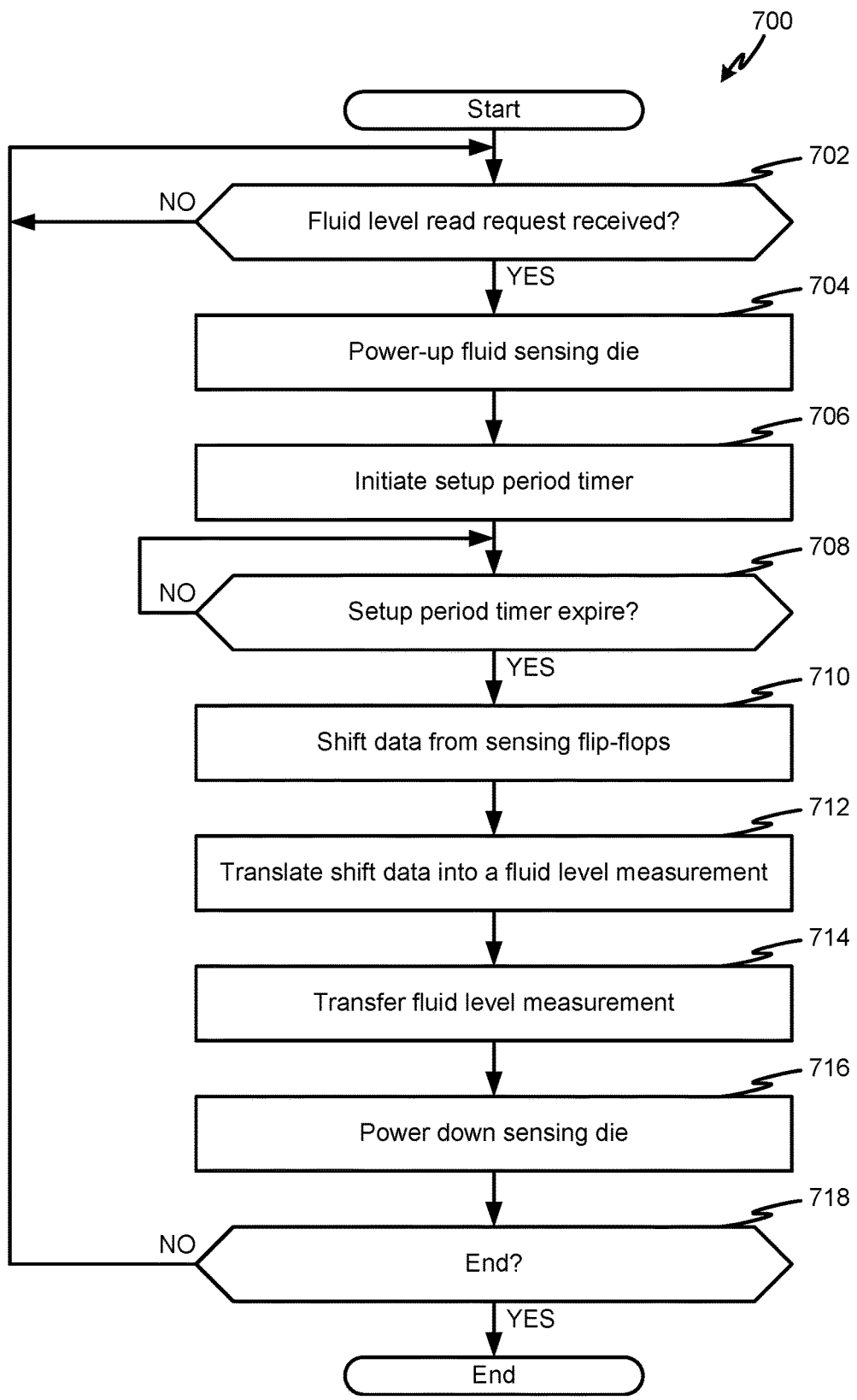
FIG. 7 is an example flowchart representative of an example process that may be executed to implement the example printing cartridges of FIGS. 1-4 and/or 5.

A flowchart representative of example machine readable instructions for implementing the printing system 100 of FIGS. 1-4 and/or 5 is shown in FIG. 7. In this example, the machine readable instructions comprise a program for execution by a processor such as the processor 812 shown in the example processor platform 800 discussed below in connection with FIG. 8. The program may be implemented in software stored on a tangible computer readable storage medium such as a CD-ROM, a floppy disk, a hard drive, a digital versatile disk (DVD), a Blu-ray disk, or a memory associated with the processor 812, but the entire program and/or parts thereof can also be executed by a device other than the processor 812 and/or implemented in firmware or dedicated hardware. Further, although the example program is described with reference to the flowchart illustrated in FIG. 7, many other methods of implementing the example printing system 100 may also be used. For example, the order of execution of the blocks may be changed, and/or some of the blocks described may be changed, eliminated, or combined.

As mentioned above, the example processes of FIG. 7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. The example processes of FIG. 7 may also be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The process 700 of FIG. 7 begins at block 702 by determining whether a fluid level read request was received. For example, the electrical interface 150 may receive a fluid level read request in response to a command from a user, in response to a page count, etc. At block 704, the process 700 of FIG. 7 initiates power-up of the sensing die 155 by, for example, the electrical interface 150 providing power (e.g., a logical high value) to the sensing die 155 via the voltage supply line 435. In response to the power provided by the voltage supply line 435, the sensing flip-flops 422 begin to store fluid level values (e.g., a logical low value or a logical high value) representative of whether fluid was detected or was not detected in the fluid container 140 by corresponding capacitor plates 425.

At block 706, the process 700 of FIG. 7 initiates a setup period. For example, the electrical interface 150 may initiate a timer. At block 708, the process 700 of FIG. 7 determines whether or not the setup timer expired. If, at block 708, the process 700 of FIG. 7 determined that the setup timer did not expire, then control returns to block 708.

If, at block 708, the process 700 of FIG. 7 determined that the setup timer did expire, then, at block 710, the process 700 of FIG. 7 "shifts-out" the information (e.g., the fluid level values) stored in the sensing flip-flops 422. For example, the electrical interface 150 may send a periodic shift clock signal to the sensing flip-flops 422 via the clock signal 440. At block 712, the process 700 of FIG. 7 translates (e.g., interprets) the fluid level values into a fluid level measurement. For example, the electrical interface 150 may map the number of fluid level values representative of proximity with fluid in the fluid container 140 to a percentage. For example, if the shift register 420 includes fifty sensing flip-flops 422, the electrical interface 150 may map twenty values indicative of proximity to fluid to a fluid level measurement that the fluid container 140 is 40 percent filled. At block 714, the process 700 of FIG. 7 transfers the fluid level measurement. For example, the electrical interface 150 may transmit the fluid level measurement to the controller 125, may store the fluid level measurement in the memory chip 145, etc. At block 716, the process 700 of FIG. 7 powers-down the sensing die 155. For example, the electrical interface 150 may transition the voltage across the voltage supply line 435 to a logical low value (e.g., zero (or substantially near zero) volts). At block 718, the process 700 of FIG. 7 determines whether to continue making fluid level measurements. If, at block 718, the process 700 of FIG. 7 determined to continue making fluid level measurements, control returns to block 702 to determine whether a fluid level read request was received. Otherwise, the example process 700 of FIG. 7 ends.

Figure 8:
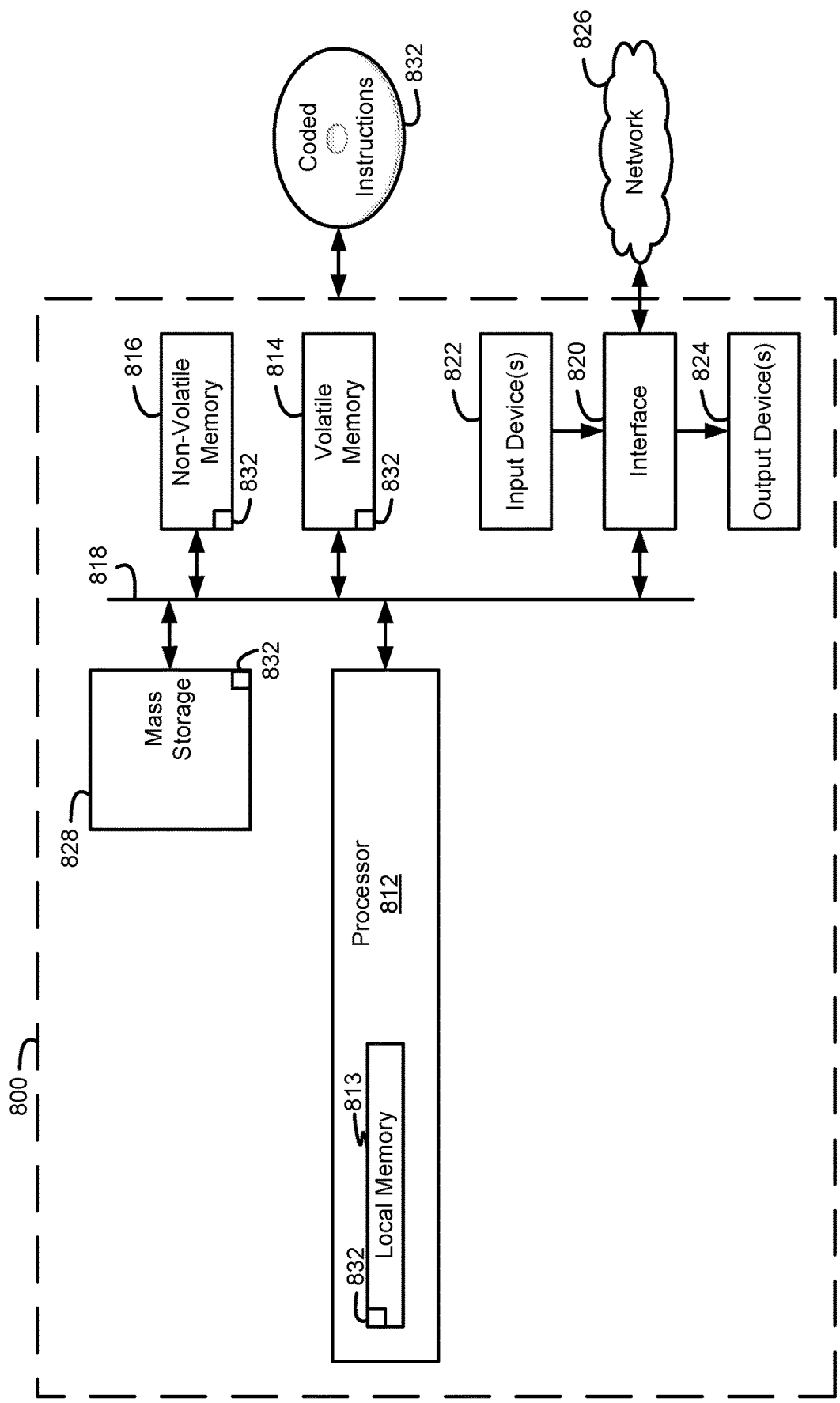
FIG. 8 is a block diagram of an example processing platform structured to execute machine-readable instructions to implement the process of FIG. 7 and/or the example printing cartridges of FIGS. 1-4 and/or 5.

FIG. 8 is a block diagram of an example processor platform 800 capable of executing machine-readable instructions to implement the process of FIG. 7 and/or the printing system 100 of FIGS. 1-4 and/or 5. The processor platform 800 can be, for example, a server, a personal computer, or any other type of computing device.

The processor platform 800 of the illustrated example includes a processor 812. The processor 812 of the illustrated example is hardware. For example, the processor 812 can be implemented by at least one of integrated circuits, logic circuits, microprocessors or controllers from any desired manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller. In some instances, the main memory may include the volatile memory 814 alone. In some instances, the main memory may include the non-volatile memory 816 alone.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, at least one input device 822 is connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

At least one output device 824 is also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, may include a graphics driver card, a graphics driver chip or a graphics driver processor.

The interface circuit 820 of the illustrated example may also include a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example may also include at least one mass storage device 828 for storing software and/or data. Examples of such mass storage devices 828 include floppy disk drives, hard drive disks, compact disk drives, Blu-ray disk drives, RAID systems, and digital versatile disk (DVD) drives.

Coded instructions 832 to implement the processes of FIG. 7 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture relate to printing cartridges and sensing fluid levels of the printing cartridges. Using the examples disclosed herein, fluid level information is stored in a series of sensing flip-flops included in a shift register. The shift register is embedded in a sensing die that is integrated with a fluid container and that extends from the top of the fluid container to the bottom of the fluid container, or a portion of the fluid container. When power is received at the shift register, the sensing flip-flops latch (e.g., store) a fluid level value representative of whether corresponding capacitor plates detected (e.g., were proximate to) fluid in the fluid container. The capacitor plates are electrically connected to the sensing flip-flops. Based on whether a capacitor plate detected fluid, the corresponding sensing flip-flop stores a first value (e.g., a logical low value) or a second value (e.g., a logical high value). After a setup period, the fluid level values are "shifted-out" of the shift register and translated (e.g., mapped) to a fluid level measurement (e.g., 40 percent filled). The disclosed methods, apparatus and articles of manufacture save print head cost by providing a simple method for capturing and communicating fluid levels in a fluid container. Furthermore, the disclosed methods, apparatus and articles of manufacture provide a simple communication protocol that reduces silicon area and costs associated with embedding silicon. The disclosed methods, apparatus and articles of manufacture also preserve the capacitor plates and integrity of the fluid by embedding the capacitor plates in the sensing die and reducing, and in some instances even avoiding, physical contact between the capacitor plates and the fluid, thereby reducing the likelihood of corrosion of the capacitor plates due to physical contact with the fluid and/or modifying properties of the fluid and/or the capacitor plates Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Although implementations for fluid level sensing apparatus and methods have been described in language specific to structural features, it is to be understood that the present subject matter is not limited to the specific features described. Rather, the specific features are disclosed and explained as example implementations for fluid level sensing apparatus and methods.

We claim:

1. A printing cartridge comprising:
a fluid container defining a volume;
a plurality of capacitor plates to detect fluid in the fluid container, respective ones of the capacitor plates associated with a respective fluid level;
an oscillator to generate a clock signal;
a shift register to, in response to the clock signal, capture fluid level information based on outputs from the plurality of capacitor plates, the shift register including a plurality of flip-flops in circuit with the plurality of capacitor plates, at least one of the flip-flops to store the fluid level information;
a voltage supply line to shift the fluid level information out of the printing cartridge, where the voltage supply line is to be pulled down a first percentage to transmit a first value from the shift register and the voltage supply line is to be pulled down a second percentage to transmit a second value from the shift register, the second percentage different than the first percentage, the second value different than the first value; and
an electrical interface to map the fluid level information to a percentage of the volume.

2. The printing cartridge of claim 1, wherein the flip-flops are to store respective fluid level values when a voltage is provided to the shift register.

3. The printing cartridge of claim 1, wherein a first one of the flip-flops is to store a first fluid level value when a corresponding capacitor plate detects presence of the fluid in the fluid container, and the first sensing flip-flop is to store a second fluid level value when the corresponding capacitor plate does not detect presence of the fluid in the fluid container.

4. The printing cartridge of claim 1, wherein the electrical interface is to map a logical high value from the shift register to the percentage of the volume.

5. The printing cartridge of claim 4, wherein the electrical interface is to:
generate a signal based on the output of the shift register; and
transmit the signal to a printer.

6. The printing cartridge of claim 1, wherein the plurality of capacitor plates are to detect a presence of fluid in the fluid container without being in physical contact with fluid.

7. A sensing die comprising:
a plurality of capacitor plates; and
a serial-in and serial-out register including a plurality of sensing flip-flops to:
monitor fluid in a fluid container via a respective capacitor plate of the plurality of capacitor plates, respective ones of the sensing flip-flops associated with a respective fluid level,
store a respective fluid level value based on a presence of fluid detected by the corresponding capacitor plate,
store the respective fluid level values in response to a voltage applied to the sensing die,
store a first fluid level value when fluid is detected by the corresponding capacitor plate and store a second fluid level value when fluid is not detected by the corresponding capacitor plate,
change a voltage on a voltage supply line a first percentage to transmit a first value corresponding to the first fluid level value, and
change the voltage on the voltage supply line a second percentage to transmit a second value corresponding to the second fluid level value, the second percentage different than the first percentage, the second value different than the first value.

8. A printing cartridge comprising:
a fluid container;
a capacitor plate positioned relative to the fluid container to detect a presence of fluid in the fluid container at a fluid level;
a sensing flip-flop in circuit with the capacitor plate, the sensing flip-flop including a latch to store fluid information representative of fluid detected by the capacitor plate at the fluid level; and
a voltage supply line to shift the fluid level information out of the printing cartridge, where the voltage supply line is to be changed a first percentage to transmit a first value from the sensing flip-flop and the voltage supply line is to be changed a second percentage to transmit a second value from the sensing flip-flop, the second percentage different than the first percentage, the second value different than the first value.

9. The apparatus of claim 8, wherein the sensing flip-slop is one of a plurality of sensing flip-flops, the plurality of sensing flip-flops to implement a shift register to capture the fluid level information of the fluid container.

10. The apparatus of claim 9, wherein the shift register is a serial-in and serial-out register.

11. The apparatus of claim 9, wherein the plurality of sensing flip-flops are to latch respective values representative of fluid detected in response to a voltage applied to the shift register.

12. The apparatus of claim 8, wherein the latch includes:
an input latch in circuit with the capacitor plate, the input latch including:
a first gate,
a first inverter, and
a second inverter; and
an output latch including:
a second gate,
a third inverter, and
a fourth inverter,
wherein the input latch is in circuit with the output latch via a fifth inverter.

13. The apparatus of claim 12, wherein the first gate is a first tristate driver and the second gate is a second tristate driver.

* * * * *